(12) United States Patent
Wang et al.

(10) Patent No.: US 12,501,136 B2
(45) Date of Patent: Dec. 16, 2025

(54) OPTICAL SYSTEM

(71) Applicant: TDK TAIWAN CORP., Taoyuan (TW)

(72) Inventors: Ying-Jen Wang, Taoyuan (TW); Yi-Ho Chen, Taoyuan (TW); Ko-Lun Chao, Taoyuan (TW); Ya-Hsiu Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 523 days.

(21) Appl. No.: 17/989,987

(22) Filed: Nov. 18, 2022

(65) Prior Publication Data

US 2023/0161224 A1 May 25, 2023

Related U.S. Application Data

(60) Provisional application No. 63/281,198, filed on Nov. 19, 2021.

(51) Int. Cl.
| | |
|---|---|
| *H04N 23/55* | (2023.01) |
| *G02B 27/64* | (2006.01) |
| *G03B 3/10* | (2021.01) |
| *G03B 13/34* | (2021.01) |
| *G03B 13/36* | (2021.01) |
| *H04N 23/68* | (2023.01) |

(52) U.S. Cl.
CPC ............... *H04N 23/55* (2023.01); *G03B 3/10* (2013.01); *G03B 13/34* (2013.01); *G03B 13/36* (2013.01); *H04N 23/687* (2023.01); *G02B 27/648* (2013.01); *G03B 2205/0038* (2013.01)

(58) Field of Classification Search
CPC ........ H04N 23/55; H04N 23/687; G03B 3/10; G03B 13/34; G03B 13/36; G03B 2205/0038; G02B 27/648
USPC ..................................................... 348/208.11
See application file for complete search history.

(56) References Cited

FOREIGN PATENT DOCUMENTS

KR 101319169 * 10/2013

* cited by examiner

*Primary Examiner* — Joel W Fosselman
(74) *Attorney, Agent, or Firm* — MUNCY, GEISSLER, OLDS & LOWE, P.C.

(57) ABSTRACT

An optical system is provided. The optical system includes a movable portion, a fixed portion, and a driving assembly. The movable portion is movable relative to the fixed portion. The driving assembly drives the movable portion to move relative to the fixed portion. The driving assembly is located between the movable portion and the fixed portion.

18 Claims, 10 Drawing Sheets

OPTICAL SYSTEM

CROSS REFERENCE TO RELATED APPLICATIONS

This application claims the benefit of U.S. Provisional Application No. 63/281,198 filed 19 Nov. 2021 the entirety of which is incorporated by reference herein.

BACKGROUND OF THE INVENTION

Field of the Invention

The present invention relates to an optical system, and, in particular, to an optical system having a driving assembly that drives an optical sensing element.

Description of the Related Art

Thanks to the rapid development of technology, it has become more common to include image-capturing and video-recording functions into various electronic devices, such as notebook computers, smartphones, and digital cameras. The use of these electronic devices is becoming more and more common. In addition to the models that have been developed to be more convenient, thin, and lightweight, it is also desirable to provide optical qualities that are better and more stable, offering the consumers more choice.

Electronic devices that have image-capturing or video-recording functions normally include one or more lenses, thereby achieving such functions as auto focus (AF), zooming, and optical image stabilization (OIS). Therefore, optical element driving mechanisms often include multiple driving assemblies for driving the optical elements to move. Conventionally, the focusing on the optical axis is realized by auto focusing of the lens module. However, some of the lens installed on the device is heavier. In these circumstances, it is relatively harder to move the lens. As a result, there is a need for an optical system that achieves focusing on the optical axis by driving the optical sensing element without the need to move the lens.

BRIEF SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to some aspect of the present disclosure, an optical system is provided. The optical system includes a movable portion, a fixed portion, and a driving assembly, wherein the movable portion is movable relative to the fixed portion, and the driving assembly drives the movable portion to move relative to the fixed portion. The driving assembly is located between the movable portion and the fixed portion.

In some of the embodiments, the movable portion includes a first optical element, the first optical element includes an optical sensing element, and the optical sensing element includes an optical sensing portion and a base. The optical sensing element further includes an optical axis. The base is located between the optical sensing portion and the driving assembly when viewed from a direction perpendicular to the optical axis. In some of the embodiments, the optical system further includes a guiding structure guiding the movement of the movable portion relative to the fixed portion along a first dimension. The first dimension is a dimension along the optical axis.

In some of the embodiments, the fixed portion includes a housing. The movable portion further includes a first surface on which the driving assembly is disposed, and the first surface is not perpendicular to the optical axis. The first surface faces the housing.

In some of the embodiments, the optical system further includes a plurality of adsorption structures generating an adsorption force. The movable portion further includes a second surface on which the plurality of adsorption structures is disposed. The second surface faces the housing. The first surface and the second surface face different directions. Each one of the plurality of adsorption structures has a magnetic permeable piece and a magnet. The guiding structure is located between the plurality of adsorption structures.

In some of the embodiments, the optical system further includes a circuit assembly. The movable portion further includes a third surface facing the circuit assembly. The third surface and the first surface face different directions. The third surface and the first surface face opposite directions. The movable portion further includes an accommodating portion to accommodate at least part of the circuit assembly. The circuit assembly further includes a flexible portion. At least part of the flexible portion is located in the accommodating portion. The movable portion further includes a second optical element. The first optical element is located between the second optical element and the flexible portion. In some of the embodiments, the circuit assembly has a first connecting end and a second connecting end, the first connecting end is fixedly connected to the fixed portion, and the second connecting end is fixedly connected to the movable portion. The first connecting end and the second connecting end are arranged along the optical axis. The first optical element further includes an electric connecting element located between the base of the optical sensing element and the circuit assembly. The electric connecting element, the optical sensing element, and the second connecting end partially overlap when viewed along the optical axis. In some of the embodiments, the optical system has a longitudinal configuration extending along the optical axis in an order of the first optical element, the driving assembly, and the circuit assembly.

In some of the embodiments, the driving assembly includes a coil assembly and a magnetic assembly corresponding to the coil assembly, wherein the coil assembly and the magnetic assembly drives the movable portion to move relative to the fixed portion along the first dimension.

In some of the embodiments, the driving assembly includes a piezoelectric assembly driving the movable portion to move along the first dimension relative to the fixed portion.

The above summary is not intended to represent each embodiment or every aspect of the present disclosure.

Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION OF THE INVENTION

Figure 1:
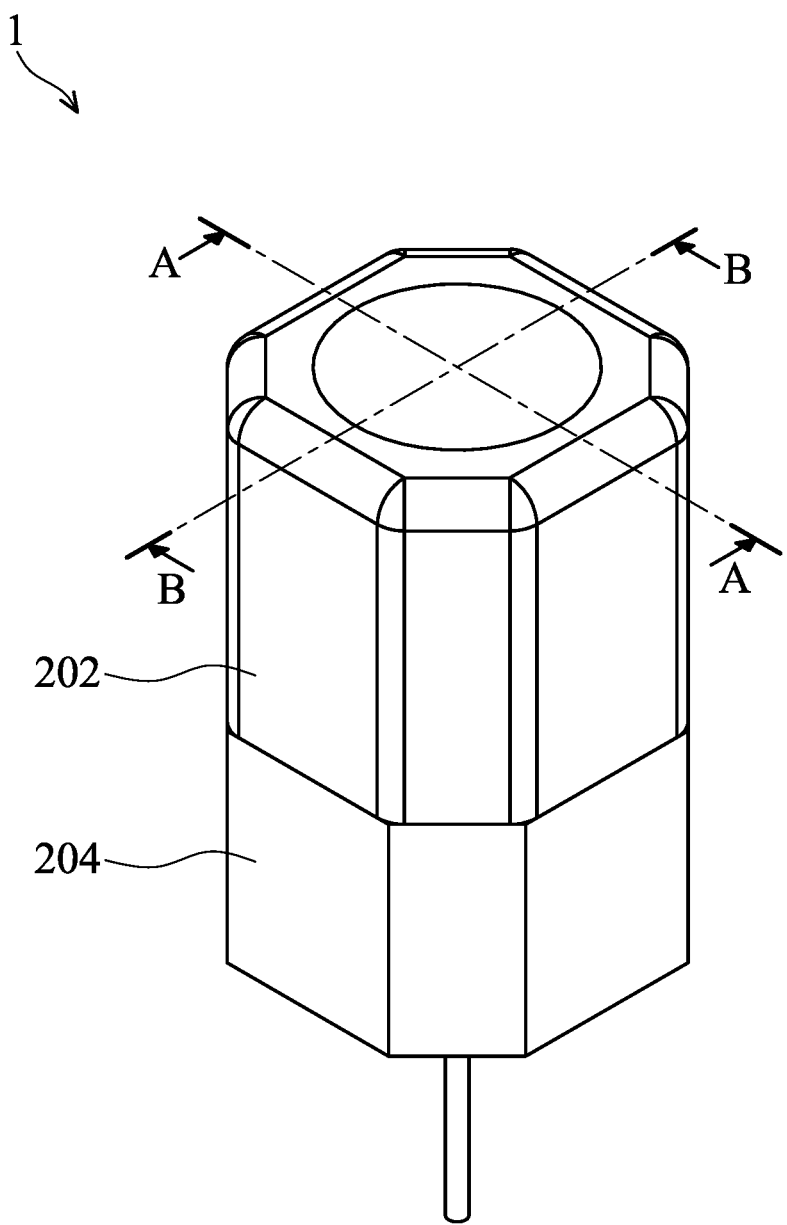
FIG. 1 is a front perspective view of an optical system, according to some aspects of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of" or any logical combination thereof.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

First, please refer to FIG. 1. FIG. 1 is a front perspective view of an optical system 1, according to some aspects of the present disclosure.

Figure 2:
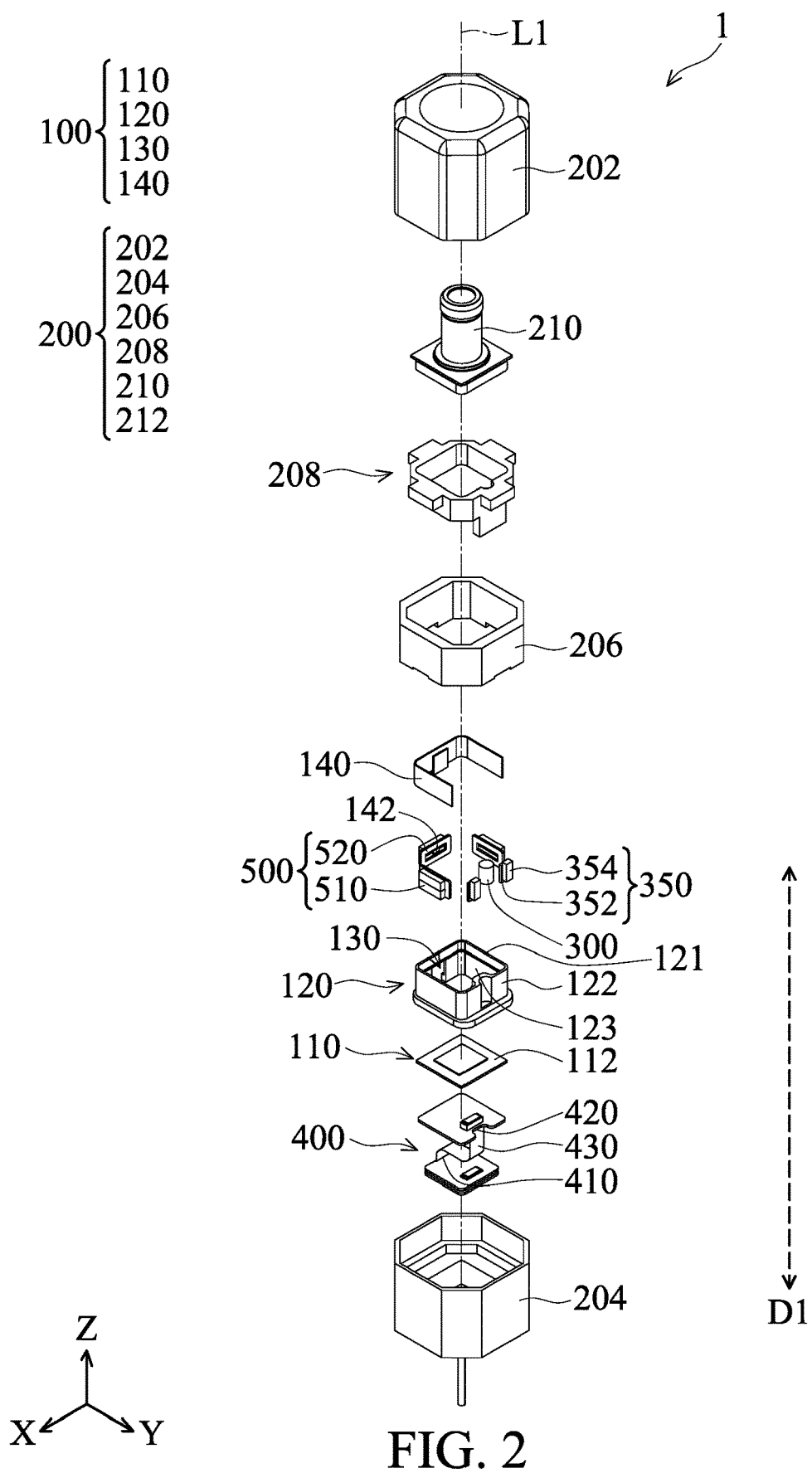
FIG. 2 is an exploded view of the optical system of FIG. 1, according to some aspects of the present disclosure.

Then, please refer to FIG. 2. FIG. 2 is an exploded view of the optical system 1, according to some aspects of the present disclosure. The optical system 1 includes a movable portion 100, a fixed portion 200, a guiding structure 300, two adsorption structures 350, a first circuit assembly 400, and a driving assembly 500.

The movable portion 100 is movable relative to the fixed portion 200, and the movable portion 100 includes a first optical element 110, a second bearing seat 120, an accommodating portion 130, and a second circuit assembly 140.

Figure 3:
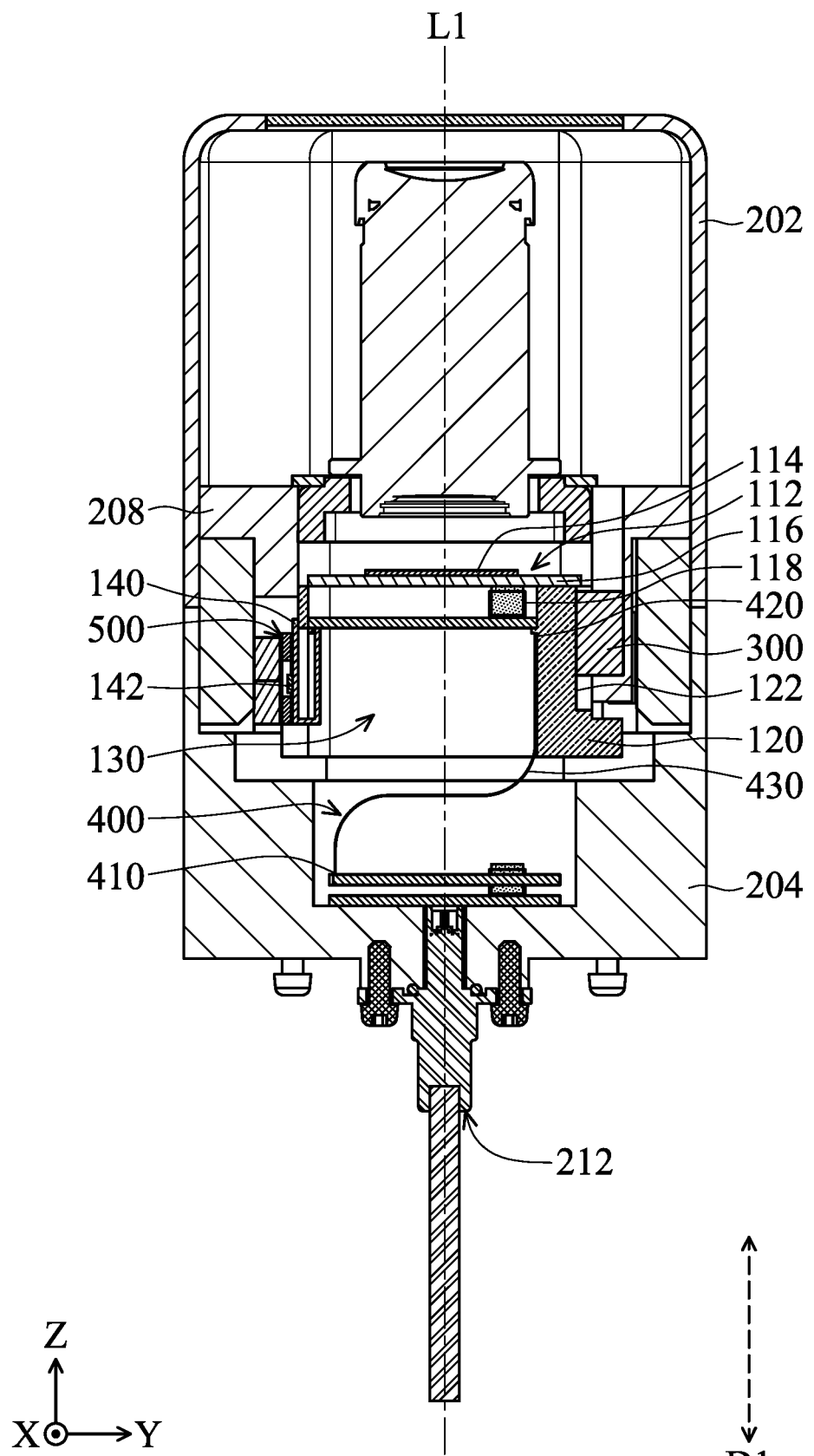
FIG. 3 is a cross-sectional view of the optical system of FIG. 1 taken across line A-A, according to some aspects of the present disclosure.

Please refer to FIG. 2 and FIG. 3 together. FIG. 3 is a cross-sectional view of the optical system 1 taken across line A-A, according to some aspects of the present disclosure. The first optical element 110 includes an optical sensing element 112, and the optical sensing element 112 includes an optical sensing portion 114, a base 116, and an electric connecting element 118. The base 116 is located on the second bearing seat 120, and the optical sensing element 112 has an optical axis L1. The electric connecting element 118 is located between the base 116 and the first circuit assembly 400 (as will be described in detail below with respect to FIG. 5). When viewed along a direction perpendicular to the optical axis L1 (e.g., the X direction), the base 116 is located between the optical sensing portion 114 and the driving assembly 500. The optical system 1 has a longitudinal configuration extending along the optical axis L1 in an order of the first optical element 110, the driving assembly 500, and the circuit assembly 400.

Figure 4:
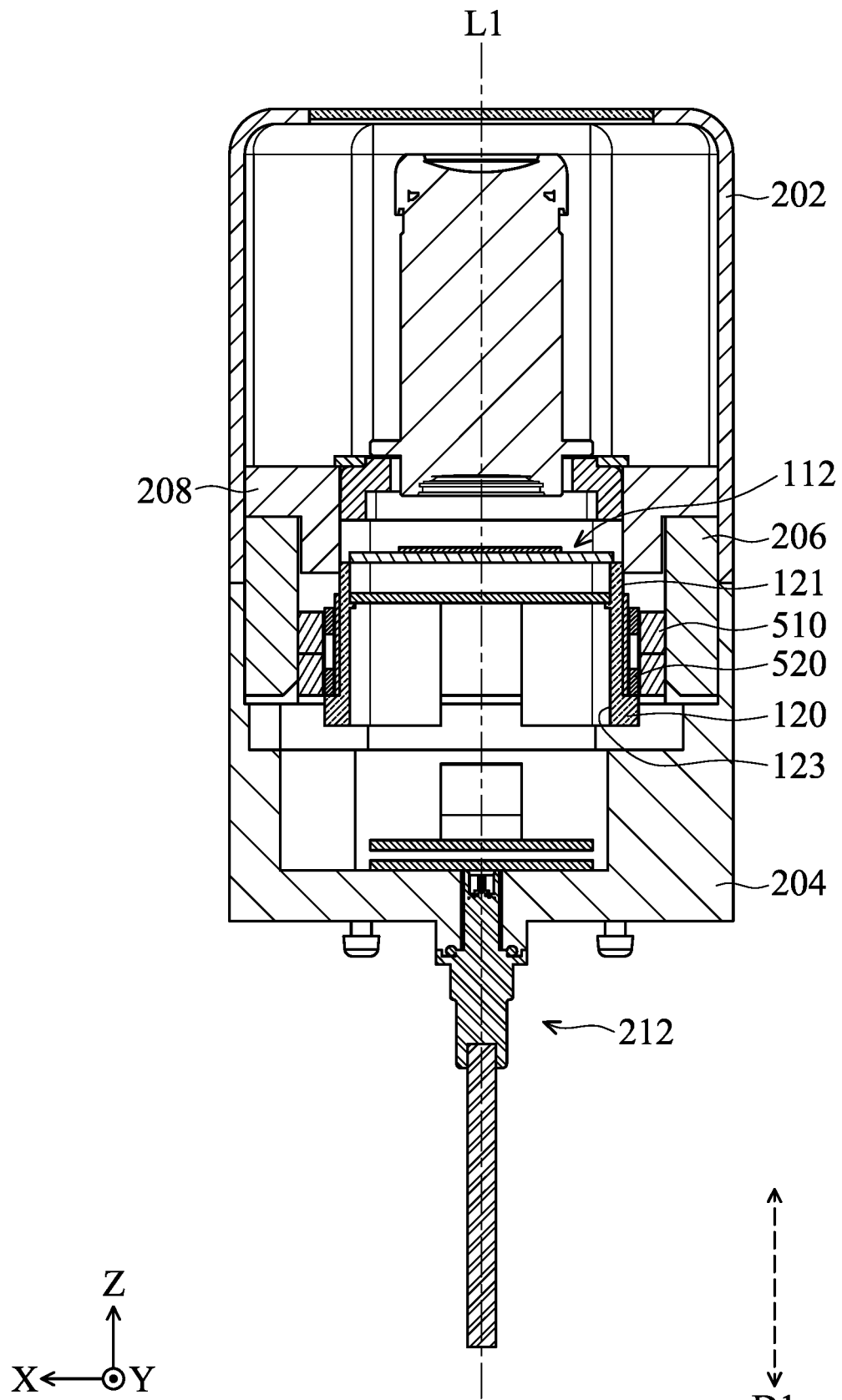
FIG. 4 is a cross-sectional view of the optical system of FIG. 1 taken across line B-B, according to some aspects of the present disclosure.

Next, please refer to FIG. 3 and FIG. 4 together. FIG. 4 is a cross-sectional view of the optical system 1 taken across line B-B, according to some aspects of the present disclosure. The second bearing seat 120 includes a first surface 121, a second surface 122, and a third surface 123. The first surface 121 and the second surface 122 are both the outer side surfaces of the second bearing seat 120 facing a housing 202 of the fixed portion 200. The third surface 123 is an inner side surface of the second bearing seat 120. The first surface 121 is not perpendicular to the optical axis L1, and the first surface 121 and the second surface 122 face different directions. The third surface 123 faces the first circuit assembly 400, and the third surface 123 and the first surface 121 face different directions. Although in FIG. 4, the third surface 123 is shown facing the opposite direction from the first surface 121, but the third surface is not limited to this configuration. The third surface 123 further faces the accommodating portion 130.

The accommodating portion 130 is the inner space of the second bearing seat 120. The accommodating portion 130 and a hollow portion of a bottom 204 of the fixed portion 200 form an accommodating space for accommodating at least part of the first circuit assembly 400.

The second circuit assembly 140 is located on the outside of the second bearing seat 120. The second circuit assembly 140 has a sensing element 142 for sensing the relative position of the second bearing seat 120 relative to the fixed portion 200.

The fixed portion 200 includes the housing 202, a bottom 204, a frame 206, a first bearing seat 208, a second optical element 210, and a fastening assembly 212. The second optical element 210 is, for example, a lens. The fastening assembly 212 may be any components suitable for fixing the optical system 1 onto other devices, such as bolts and nuts.

Please refer to FIG. 2 and FIG. 3 together again. The guiding structure 300 guides the movable portion 100 to move relative to the fixed portion 200 in a first dimension D1. The first dimension D1 is a dimension along the optical axis L1. In this example, the guiding structure 300 is cylindrical and extends along the optical axis L1. However, the guiding structure 300 may have any other shape or configuration, as desired. For example, it may have a ball shape (as will be described further below with respect to FIG. 7). The first bearing seat 208 of the fixed portion 200 and the second bearing seat 120 of the movable portion 100 are engaged with the shape of the guiding structure 300. For example, the guiding structure 300 is cylindrical in this example, and the first bearing seat 208 and the second bearing seat 120 each have a cylindrical groove for accommodating and fitting the guiding structure 300 (as illustrated in FIG. 2 and FIG. 4). The guiding structure 300 is located between the two adsorption structures 350.

Please refer to FIG. 2. Two adsorption structures 350 are disposed on the second surface 122 of the second bearing seat 120. Each one of the adsorption structures 350 includes a magnetic permeable piece 352 and a magnet 354 for generating an adsorption force. The adsorption force adsorbs the second bearing seat 120 with the frame 206 of the fixed portion 200, further assisting the guiding structure 300 to guide the movement of the movable portion 100 relative to the fixed portion 200, preventing the movable portion 100 from tilting during movement.

Figure 5:
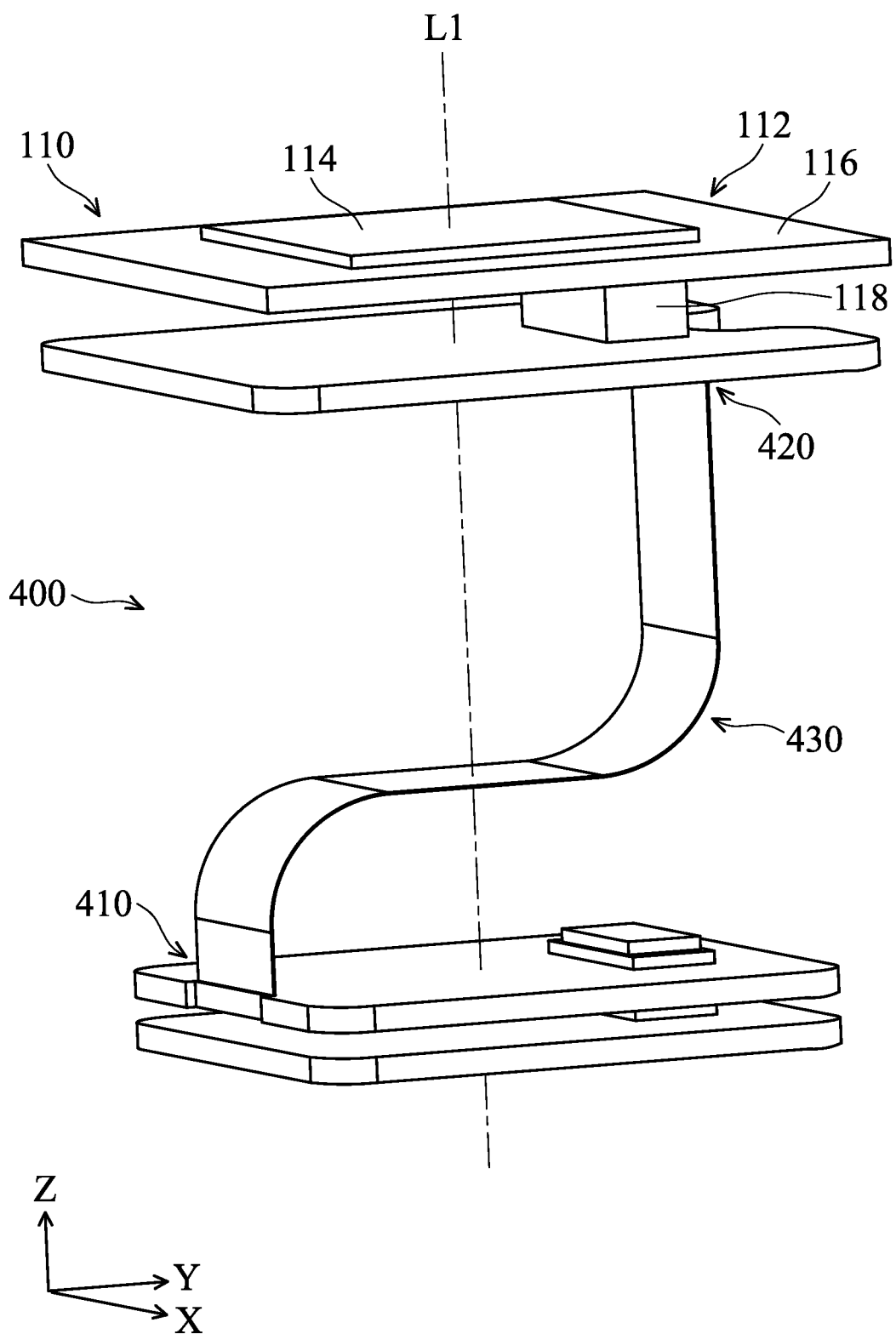
FIG. 5 is a front perspective view of a circuit assembly and an optical sensing element in the optical system of FIG. 1, according to some aspects of the present disclosure.

Next, please refer to FIG. 2 and FIG. 5 together. FIG. 5 is a front perspective view of the first circuit assembly 400 and the optical sensing element 112 in the optical system 1, according to some aspects of the present disclosure. The first circuit component 400 has a first connecting end 410, a second connecting end 420, and a flexible portion 430. The first optical element 110 is located between the second optical element 210 and the flexible portion 430. The first connecting end 410 is fixedly connected to the bottom 204 of the fixed portion 200. The second connecting end 420 is fixedly connected to the first optical element 110 of the movable portion 100. The first connecting end 410 and the second connecting end 420 are arranged along the optical axis L1. When viewed along the direction of the optical axis L1, the electric connecting element 118, the optical sensing element 112, and the second connecting end 420 at least partially overlap. At least part of the flexible portion 430 is located within the accommodating portion 130.

The driving assembly 500 drives the movement of the movable portion 100 relative to the fixed portion 200. The driving assembly 500 is located between the movable portion 100 and the fixed portion 200, and is disposed on the first surface 121 of the second bearing seat 120. In this embodiment, the driving assembly 500 includes a driving magnet assembly 510 and a coil assembly 520, and the driving magnet assembly 510 corresponds to the coil assembly 520. The driving magnet assembly 510 and the coil assembly 520 drive the movable portion 100 to move relative to the fixed portion 200 in the first dimension D1. Although in this example the driving assembly 500 is a configuration of coil assembly and driving magnet assembly, the driving assembly 500 may be in any other configuration as desired, such as a piezoelectric assembly (as will be described further below with respect to FIG. 6). In FIG. 4, the coil assembly 520 is disposed on the first surface 121, but the coil assembly 520 is not limited to this configuration. For example, the coil assembly 520 may also be disposed on the third surface 123 and located in the accommodating portion 130.

When the optical system 1 is powered on, the sensing element 142 senses the driving magnet assembly 510 to generate a signal, and a controlling circuit on the second circuit assembly 140 controls the driving assembly 500 according to the signal to drive the second bearing seat 120 of the movable portion 100. The second bearing seat 120 carries the first optical element 110 to perform translational movement in the first dimension D1 (along the optical axis L1). The flexible portion 430 of the first circuit assembly 400 expands and contracts with the movement of the movable portion 100, and provides support as well as downward stabilizing force. In this way, the optical system 1 may achieve focusing or zooming by moving the optical sensing element 112 without moving the second optical element 210.

Figure 6:
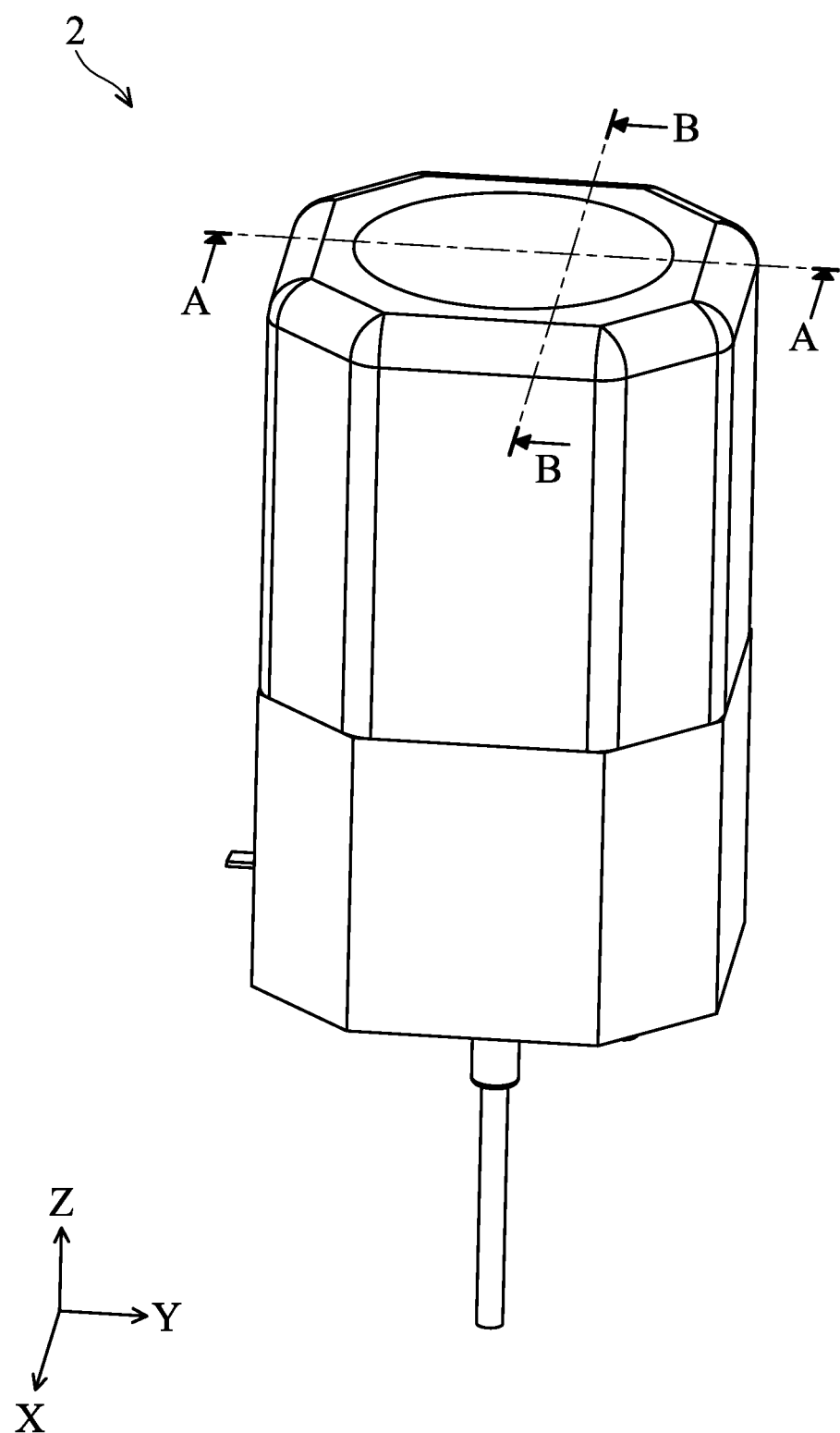
FIG. 6 is a front perspective view of another optical system, according to some aspects of the present disclosure.
Figure 7:
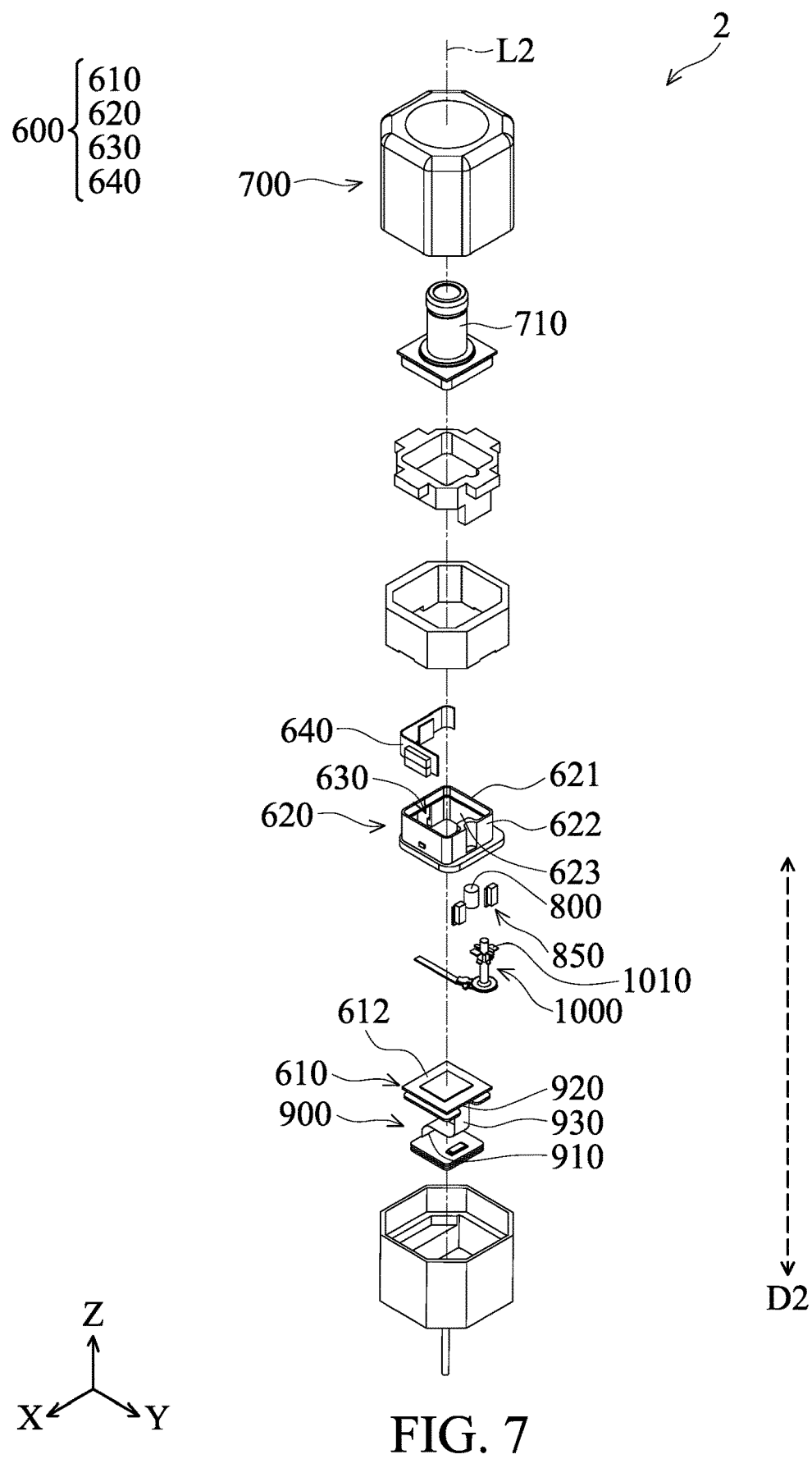
FIG. 7 is an exploded view of the optical system of FIG. 6, according to some aspects of the present disclosure.

Next, please refer to FIG. 6 and FIG. 7. FIG. 6 is a front perspective view of another optical system 2, according to some aspects of the present disclosure. FIG. 7 is an exploded view of the optical system 2, according to some aspects of the present disclosure. The optical system 2 is similar to the optical system 1, wherein the same tens and ones digits are used for reference signs of similar elements. The difference between the optical system 2 and the optical system 1 lies in the second circuit assembly of the movable portion and the driving assembly.

The optical system 2 includes a movable portion 600, a fixed portion 700, a guiding structure 800, two adsorption structures 850, a first circuit assembly 900, and a driving assembly 1000.

The movable portion 600 is movable relative to the fixed portion 700, and the movable portion 600 includes a first optical element 610, a second bearing seat 620, an accommodating portion 630, and a second circuit assembly 640.

Figure 8:
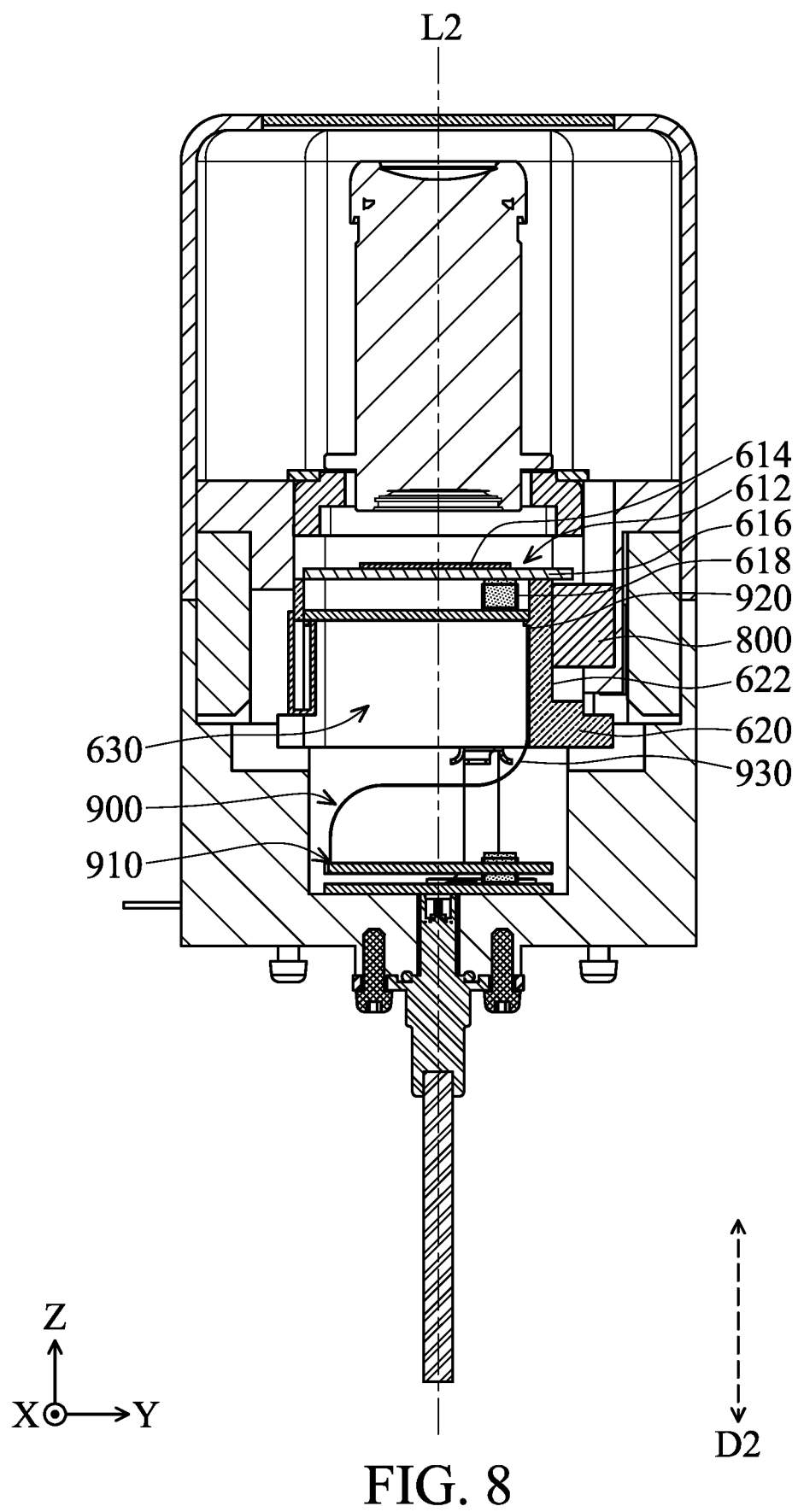
FIG. 8 is a cross-sectional view of the optical system of FIG. 6 taken across line A-A, according to some aspects of the present disclosure.

Please refer to FIG. 7 and FIG. 8 together. FIG. 8 is a cross-sectional view of the optical system 2 taken across line A-A, according to some aspects of the present disclosure. The first optical element 610 includes an optical sensing element 612, and the optical sensing element 612 includes an optical sensing portion 614, a base 616, and an electric connecting element 618. The optical sensing element 612 has an optical axis L2.

Figure 9:
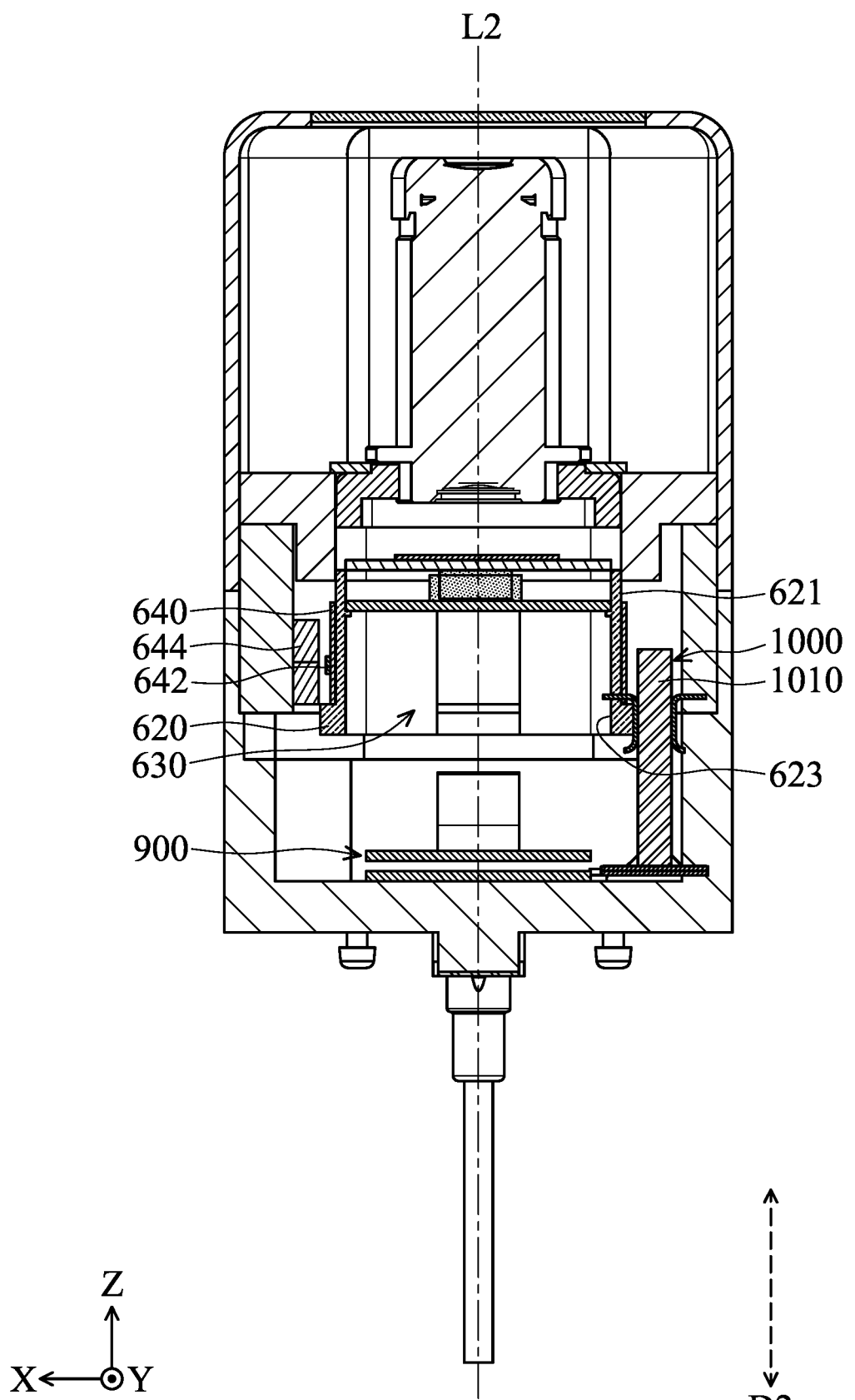
FIG. 9 is a cross-sectional view of the optical system of FIG. 6 taken across line B-B, according to some aspects of the present disclosure.

Next, please refer to FIG. 8 and FIG. 9 together. FIG. 9 is a cross-sectional view of the optical system 2 taken across line B-B, according to some aspects of the present disclosure. The second bearing seat 620 includes a first surface 621, a second surface 622, and a third surface 623.

The second circuit assembly 640 is located on the outside of the second bearing seat 620. The second circuit assembly 640 has a sensing element 642 and a sensing magnet 644 for sensing the relative position of the second bearing seat 620 relative to the fixed portion 700.

The guiding structure 800 guides the movable portion 600 to move relative to the fixed portion 700 in a second dimension D2. The second dimension D2 is a dimension along the optical axis L2.

Please refer to FIG. 8 again. The first circuit component 900 has a first connecting end 910, a second connecting end 920, and a flexible portion 930. The first connecting end 910 and the second connecting end 920 are arranged along the optical axis L2. When viewed along the direction of the optical axis L2, the electric connecting element 618, the optical sensing element 612, and the second connecting end 920 at least partially overlap.

The driving assembly 1000 drives the movement of the movable portion 600 relative to the fixed portion 700. The driving assembly 1000 is located between the movable portion 600 and the fixed portion 700, and is disposed on the first surface 621 of the second bearing seat 620. In this example, the driving assembly 1000 includes a piezoelectric assembly 1010. The piezoelectric assembly 1010 drives the movable portion 600 to move relative to the fixed portion 700 in the second dimension D2. Although in this example the driving assembly 1000 includes a piezoelectric element, but the driving assembly 1000 is not limited to the configuration of piezoelectric assembly. The driving assembly 1000 may be in any other configuration as desired.

When the optical system 2 is powered on, the sensing element 642 senses the sensing magnet 644 to generate a signal, and a controlling circuit on the second circuit assembly 640 controls the driving assembly 1000 according to the signal to drive the second bearing seat 620 of the movable portion 600. The second bearing seat 620 carries the first optical element 610 to perform translational movement in the second dimension D2 (along the optical axis L2). The flexible portion 930 of the first circuit assembly 900 expands and contracts with the movement of the movable portion 600, and provides support as well as downward stabilizing force. In this way, the optical system 2 may achieve focusing or zooming by moving the optical sensing element 612 without moving a second optical element 710 of the fixed portion 700.

Figure 10:
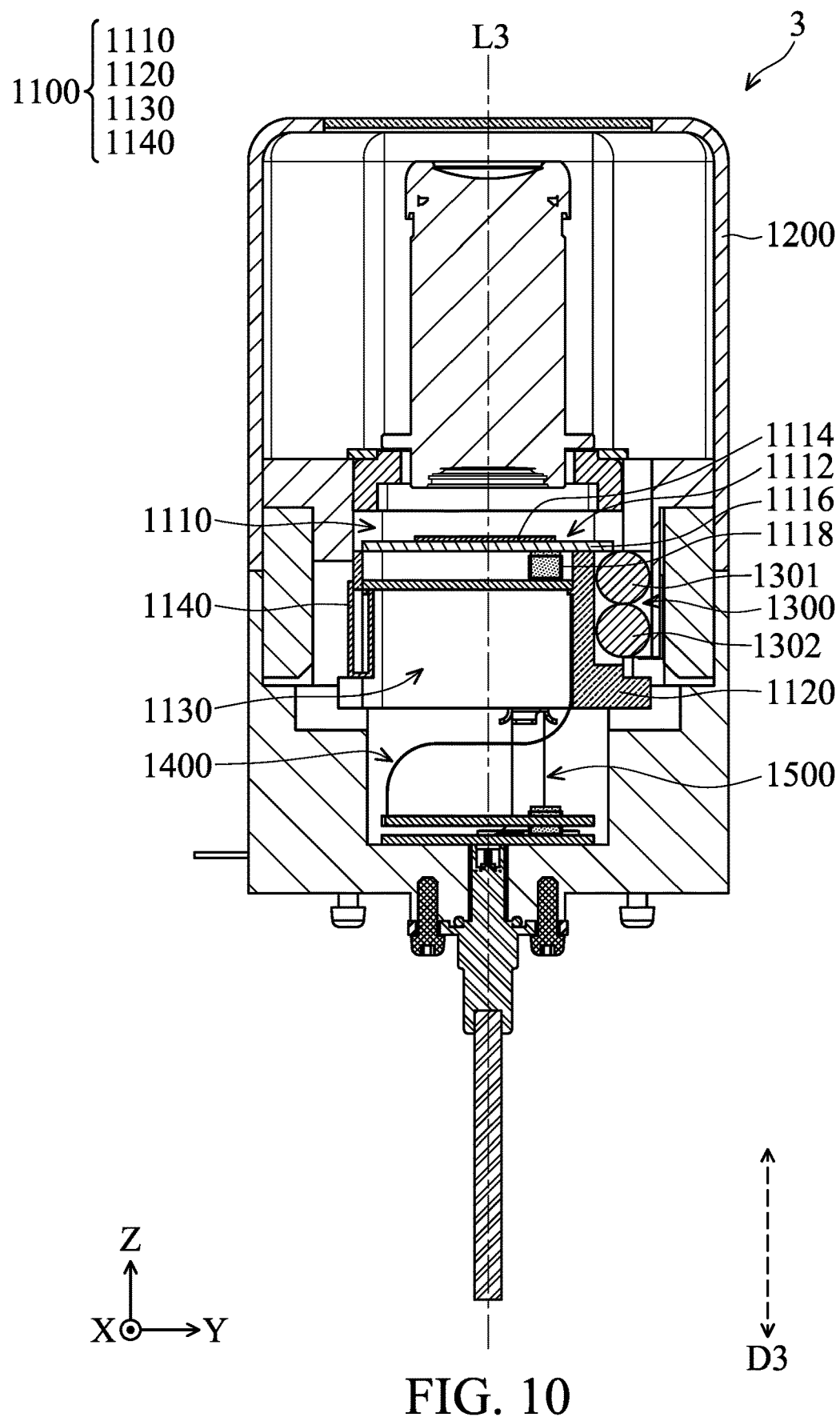
FIG. 10 is a schematic diagram of a guiding structure of another optical system, according to some aspects of the present disclosure.

Please refer to FIG. 10. FIG. 10 is a schematic diagram of the guiding structure of another optical system 3, according to some aspects of the present disclosure. The optical system 3 is similar to the optical system 1 and the optical system 2, wherein the same tens and ones digits are used for reference signs of similar elements. The difference between the optical system 3 and the optical system 2 lies in the guiding structure.

The optical system 3 includes a movable portion 1100, a fixed portion 1200, a guiding structure 1300, a plurality of adsorption structures (not shown in FIG. 10), a first circuit assembly 1400, and a driving assembly 1500.

The movable portion 1100 is movable relative to the fixed portion 1200, and the movable portion 1100 includes a first optical element 1110, a second bearing seat 1120, an accommodating portion 1130, and a second circuit assembly 1140.

The first optical element 1110 includes an optical sensing element 1112, and the optical sensing element 1112 includes an optical sensing portion 1114, a base 1116, and an electric connecting element 1118. The optical sensing element 1112 has an optical axis L3.

The guiding structure 1300 guides the movable portion 1100 to move relative to the fixed portion 1200 in a third dimension D3. The third dimension D3 is a dimension along the optical axis L3.

In this example, the guiding structure 1300 is of two balls 1301 and 1302. However, the amount of the balls is not limited to two, and the guiding structure 1300 is not limited to the configuration of cylindrical or balls, the guiding structure 1300 may have any other shape or configuration, as desired.

Additionally, the driving assembly 1500 may be a coil and a driving magnet assembly such as the driving assembly 500 of the optical system 1, or a piezoelectric assembly such as the driving assembly 1000 of the optical system 2. The driving component 1500 is not limited to the above-mentioned configuration. The drive assembly 1500 may be in any other configuration as desired.

In summary, the present disclosure provides an optical system that may achieve focusing and zooming in the optical axis direction by driving the optical sensing element without moving the lens.

While various embodiments of the present disclosure have been described above, it should be understood that they have been presented by way of example only, and not limitation. Numerous changes to the disclosed examples can be made in accordance with the disclosure herein without departing from the spirit or scope of the disclosure. Thus, the breadth and scope of the present disclosure should not be limited by any of the above-described examples. Rather, the scope of the disclosure should be defined in accordance with the following claims and their equivalents.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

What is claimed is:

1. An optical system, comprising:
    a movable portion, comprising a first optical element, wherein the first optical element comprises an optical sensing element, and the optical sensing element comprises an optical sensing portion, a base, and an optical axis;
    a fixed portion, wherein the movable portion is movable relative to the fixed portion; and
    a driving assembly driving the movable portion to move relative to the fixed portion;
    wherein the driving assembly is located between the movable portion and the fixed portion; and
    the base is located between the optical sensing portion and the driving assembly when viewed from a direction perpendicular to the optical axis.

2. The optical system as claimed in claim 1, further comprising a guiding structure guiding the movement of the movable portion relative to the fixed portion along a first dimension, wherein the first dimension is a dimension along the optical axis.

3. The optical system as claimed in claim 2, wherein the driving assembly comprises:

a coil assembly; and a magnetic assembly corresponding to the coil assembly, wherein the coil assembly and the magnetic assembly drive the movable portion to move relative to the fixed portion along the first dimension.

4. The optical system as claimed in claim 2, wherein the driving assembly comprises a piezoelectric assembly driving the movable portion to move relative to the fixed portion along the first dimension.

5. The optical system as claimed in claim 1, wherein the fixed portion comprises a housing; the movable portion further comprises a first surface on which the driving assembly is disposed, and the first surface is not perpendicular to the optical axis, the first surface faces the housing.

6. The optical system as claimed in claim 5, further comprising a plurality of adsorption structures generating an adsorption force, wherein the movable portion further comprises a second surface on which the plurality of adsorption structures are disposed, the second surface faces the housing.

7. The optical system as claimed in claim 6, wherein the first surface and the second surface face different directions.

8. The optical system as claimed in claim 6, wherein each one of the plurality of adsorption structures has a magnetic permeable piece and a magnet, and a guiding structure is located between the plurality of adsorption structures.

9. The optical system as claimed in claim 5, further comprising a circuit assembly; wherein the movable portion further comprises a third surface facing the circuit assembly.

10. The optical system as claimed in claim 9, wherein the third surface and the first surface face different directions.

11. The optical system as claimed in claim 9, wherein the movable portion further comprises an accommodating portion to accommodate at least part of the circuit assembly.

12. The optical system as claimed in claim 11, wherein the circuit assembly further comprises a flexible portion, and at least part of the flexible portion is located in the accommodating portion.

13. The optical system as claimed in claim 12, wherein the movable portion further comprises a second optical element, and the first optical element is located between the second optical element and the flexible portion.

14. The optical system as claimed in claim 9, wherein the circuit assembly has a first connecting end and a second connecting end, the first connecting end is fixedly connected to the fixed portion, and the second connecting end is fixedly connected to the movable portion.

15. The optical system as claimed in claim 14, wherein the first connecting end and the second connecting end are arranged along the optical axis.

16. The optical system as claimed in claim 14, wherein the first optical element further comprises an electric connecting element located between the base of the optical sensing element and the circuit assembly.

17. The optical system as claimed in claim 16, wherein the electric connecting element, the optical sensing element, and the second connecting end partially overlap when viewed along the optical axis.

18. The optical system as claimed in claim 9, wherein the optical system has a longitudinal configuration extending along the optical axis in an order of the first optical element, the driving assembly, and the circuit assembly.

* * * * *